US012668424B2

(12) United States Patent
Hasegawa et al.

(10) Patent No.: US 12,668,424 B2
(45) Date of Patent: Jun. 30, 2026

(54) ARTICLE TRANSPORT FACILITY

(71) Applicant: Daifuku Co., Ltd., Osaka (JP)

(72) Inventors: Yutaka Hasegawa, Hinocho (JP);
Tetsuya Kuroki, Hinocho (JP); Naoki Douba, Hinocho (JP); Makoto Ueda, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 386 days.

(21) Appl. No.: 18/372,159

(22) Filed: Sep. 25, 2023

(65) Prior Publication Data

US 2024/0101349 A1     Mar. 28, 2024

(30) Foreign Application Priority Data

Sep. 26, 2022    (JP) ................................. 2022-152904

(51) Int. Cl.
B65G 1/06 (2006.01)
B65G 35/06 (2006.01)
(52) U.S. Cl.
CPC ............. B65G 1/065 (2013.01); B65G 35/06 (2013.01); B65G 2203/0283 (2013.01)
(58) Field of Classification Search
CPC ...... B65G 1/065; B65G 1/0492; B65G 35/06; B65G 2203/283; B65G 17/20; A47B 47/027; A47B 57/402
See application file for complete search history.

(56) References Cited

U.S. PATENT DOCUMENTS

2019/0332096 A1* 10/2019 Porter .................. G05D 1/2446
2021/0188544 A1*  6/2021 Austrheim ........... G05D 1/0291
2025/0153943 A1*  5/2025 Prüglmeier ............ B65G 1/065

FOREIGN PATENT DOCUMENTS

JP            202250240 A    3/2022
WO     WO-2024040283 A1 *  2/2024  ........... E04B 1/2604

* cited by examiner

Primary Examiner — Saul Rodriguez
Assistant Examiner — Jaimin G Patel
(74) Attorney, Agent, or Firm — The Webb Law Firm

(57) ABSTRACT

An article transport facility includes a transport vehicle configured to travel on a travel surface on each of a plurality of travel floors. The transport vehicle is configured to travel straight and to change directions by executing turning movement to turning about an axis in the up-down direction on a spot. Columns extend through the travel floors in the up-down direction and protrude upward of the travel surface. Each travel floor has column through holes that are for the columns to extend through. The column through holes do not overlap a first straight path, a second straight path, and a turning path as viewed in the up-down direction, and overlap at least either a first tangent line or a second tangent line.

4 Claims, 6 Drawing Sheets

ARTICLE TRANSPORT FACILITY

CROSS-REFERENCE TO RELATED APPLICATION

This application claims priority to Japanese Patent Application No. 2022-152904 filed Sep. 26, 2022, the disclosure of which is hereby incorporated by reference in its entirety.

BACKGROUND OF THE INVENTION

1. Field of the Invention

The present invention relates to an article transport facility that includes travel floors at a plurality of levels in an up-down direction, a support frame supporting the travel floors, and a transport vehicle configured to travel on a travel surface on each of the travel floors.

2. Description of Related Art

In recent years, automation of article transport has progressed in article transport facilities, such as distribution warehouses. This type of article transport facility often utilizes transport vehicles, such as a transport vehicle (10) disclosed in JP 2022-050240A (Patent Document 1), for example. The transport vehicle (10) is configured to travel on a travel floor unmanned and transport an article.

SUMMARY OF THE INVENTION

Providing travel floors for the transport vehicles to travel at a plurality of levels increases the usage range of the facility, and improvement in the capacity of the entire facility can be expected. Columns for supporting the travel floors are required so as to be able to provide the travel floors at a plurality of levels. However, interference between the columns and the transport vehicles needs to be avoided, and thus there are limitations on the positions at which the columns are disposed due to the relationship between the columns and travel routes of the transport vehicles. For example, it is conceivable to expand the travel floors in a plane in order to create space between the columns and the travel routes, but simply expanding the travel floors will create wasted space and is likely to reduce spatial efficiency.

In view of the foregoing actual circumstances, it is desired to realize an article transport facility in which interference between the columns and the transport vehicles can be avoided while setting the travel routes close to each other on the travel floors.

A technology for solving the above problem is as follows.

An article transport facility includes:

travel floors at a plurality of levels in an up-down direction;

a support frame supporting the travel floors; and a transport vehicle configured to travel on a travel surface on each of the travel floors, wherein the support frame is a combination of a plurality of columns and a plurality of beams, the travel surface on each of the travel floors includes upper faces of a plurality of floor plates next to each other in a plane, the transport vehicle is configured to travel straight and to change directions by executing a turning movement to turn about an axis in the up-down direction on a spot, the travel surface includes a first travel route, which is a travel route of the transport vehicle along a first direction, a second travel route, which is a travel route of the transport vehicle V along a second direction, and at least one turning position, which is at an intersecting point of the first travel route and the second travel route and at which the transport vehicle is allowed to turn, with the first direction referring to a specific direction parallel to the travel surface, and the second direction referring to a direction that is parallel to the travel surface and orthogonal to the first direction, each of the columns extends in the up-down direction through at least one of the travel floors at one of the plurality of levels, and protrudes upward of the travel surface on the at least one travel floor, and each of the travel floors has column through holes that are through holes for the corresponding columns to extend through, and each of the column through holes does not overlap a first straight path, a second straight path, and a turning path as viewed in the up-down direction, and overlaps at least either a first tangent line or a second tangent line, with the first straight path referring to a path of the transport vehicle while traveling straight along the first travel route, the second straight path referring to a path of the transport vehicle while traveling straight along the second travel route, a turning path referring to a path of the transport vehicle while turning at the turning position, the first tangent line referring to a tangent line to an outer edge of the turning path parallel to the first direction, and the second tangent line referring to a tangent line to the outer edge of the turning path parallel to the second direction.

According to this configuration, interference between the columns and the transport vehicle traveling along any travel route can be avoided while setting the travel routes close to each other on each travel floor. In addition, the configuration that allows the columns to extend through each travel floor and protrude upward of the travel surface enables the columns to be disposed not only at an outer edge of each travel floor but also on the central side of the travel floor. Accordingly, the rigidity of the travel floors at the plurality of levels can be easily ensured.

Further features and advantages of the technology according to the present disclosure will become more apparent in the description of the following illustrative and non-limiting embodiment, which will be described with reference to the drawings.

DESCRIPTION OF THE INVENTION

An embodiment of an article transport facility will be described below with reference to the drawings.

Overview of Article Transport Facility

Figure 1:
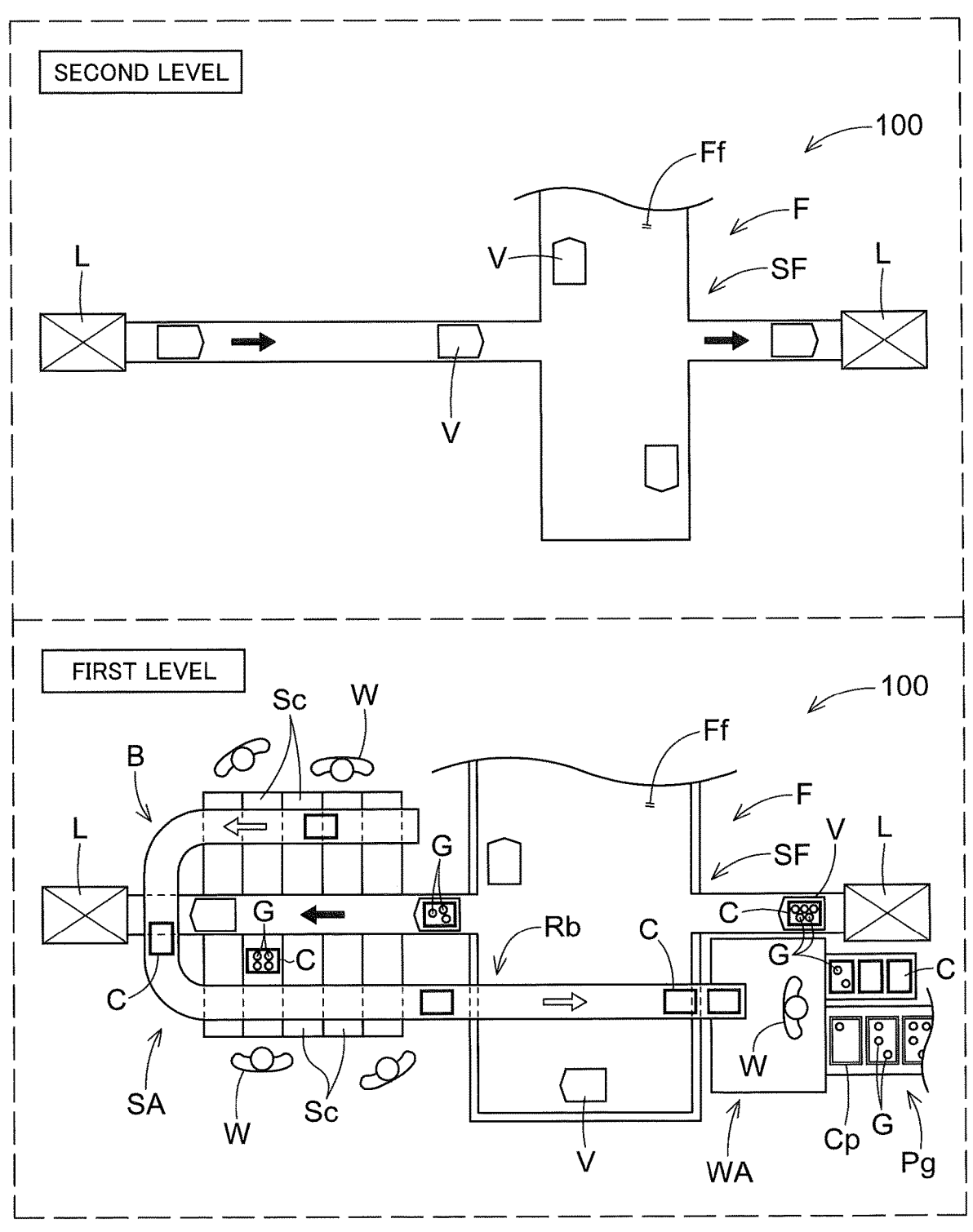
FIG. 1 is a plan view of travel floors at first and second levels in an article transport facility.

First, an overview of the article transport vehicle will be provided with reference to FIG. 1. An article transport facility 100 includes travel floors F at a plurality of levels in an up-down direction, a support frame SF supporting the travel floors F, and transport vehicles V that travel on travel surfaces Ff on the travel floors F, as shown in FIG. 1. A plurality of transport vehicles V travel on the travel surface Ff on the travel floor F at each level.

The article transport facility 100 in the example shown in FIG. 1 has the travel floors F at two levels. FIG. 1 shows the travel floors F at first and second levels. However, without limitation to this configuration, the article transport facility 100 may have the travel floors F at three or more levels.

Each transport vehicle V is configured to transport an article G. The transport vehicle V is configured to travel straight and to change directions by executing a turning movement, i.e. turning about an axis in the up-down direction on a spot. The transport vehicle V can travel on the travel surfaces Ff on the travel floors F at the first and second levels by traveling straight and performing turning movements.

The article transport facility 100 includes a pair of lifters L that raise and lower the transport vehicles V between the travel floors F at the plurality of levels (two levels in this example), an article supply section Pg to which articles G are supplied, a work area WA where work to deliver the articles G supplied from the article supply section Pg to the transport vehicles V is performed, a sorting area SA where work to sort the articles G is performed, and an empty container collection device B that collects empty containers C resulting from the sorting work performed in the sorting area SA.

In the present embodiment, both the work area WA and the sorting area SA are located at the same level as the travel floor F at the first level. The travel floor F at the second level has neither the work area WA nor the sorting area SA.

The work area WA is adjacent to both a travel route R of the transport vehicle V and the article supply section Pg on the travel floor F at the first level. The article supply section Pg of the present embodiment is the section where the articles G contained in supply containers Cp are supplied to the work area WA. The article G contained in each supply container Cp is taken out in the work area WA and delivered to a transport vehicle V waiting on the travel route R. The article G may be delivered to the transport vehicle V with the article G contained in a container C different from the supply container Cp, or may be delivered as-is without being contained in the container C. In the present embodiment, the above work performed in the work area WA is performed by workers W. Note that the above work may alternatively be performed by robots, or both the workers W and robots.

The sorting area SA is adjacent to the travel route R at a location away from the work area WA. The transport vehicle V transports the article G received at the work area WA to the sorting area SA. The sorting work for the article G transported by the transport vehicle V is performed in the sorting area SA. The sorting area SA of the present embodiment has a plurality of sorting conveyors Sc. The transport vehicle V delivers the article G to any one of the sorting conveyors Sc. The sorting work for the article G delivered to the sorting conveyor Sc by the transport vehicle V is performed in the sorting area SA. The sorting work is performed based on predetermined order information. The order information includes various pieces of information such as customer information, shipping destination information, and article type information, for example.

To transport the article G in the container C to the sorting area SA, the transport vehicle V delivers the article G in a state of being contained in the container C to the sorting conveyor SC. In this case, removal work performed to remove the article G from the container C transported by the transport vehicle V is performed in the sorting area SA. The empty container C resulting from this removal work is collected by the empty container collection device B. The empty container C collected by the empty container collection device B is transported along a collection route Rb to the work area WA and used for work performed in the work area WA. In the present embodiment, the work performed in the sorting area SA (including the aforementioned removal work) is performed by workers W. Note that the sorting work may alternatively be performed by robots, or both the workers W and robots.

After delivering the article G to the sorting area SA, the transport vehicle V rides one of the lifters L to the travel floor F at the other level (the travel floor F at the second level in this example). The transport vehicle V then travels on the travel floor F at the second level and rides the other lifter L back to the travel floor F at the level where the aforementioned work area WA and sorting area SA are located (the travel floor F at the first level in this example). The returning transport vehicle V receives an article G in the work area WA and transports the article G to the sorting area SA in the same manner as described above.

Configuration of Travel Floor

Next, a configuration of the travel floor F will be described in detail. The plurality of travel floors F are supported by the support frame SF, as mentioned above.

Figure 2:
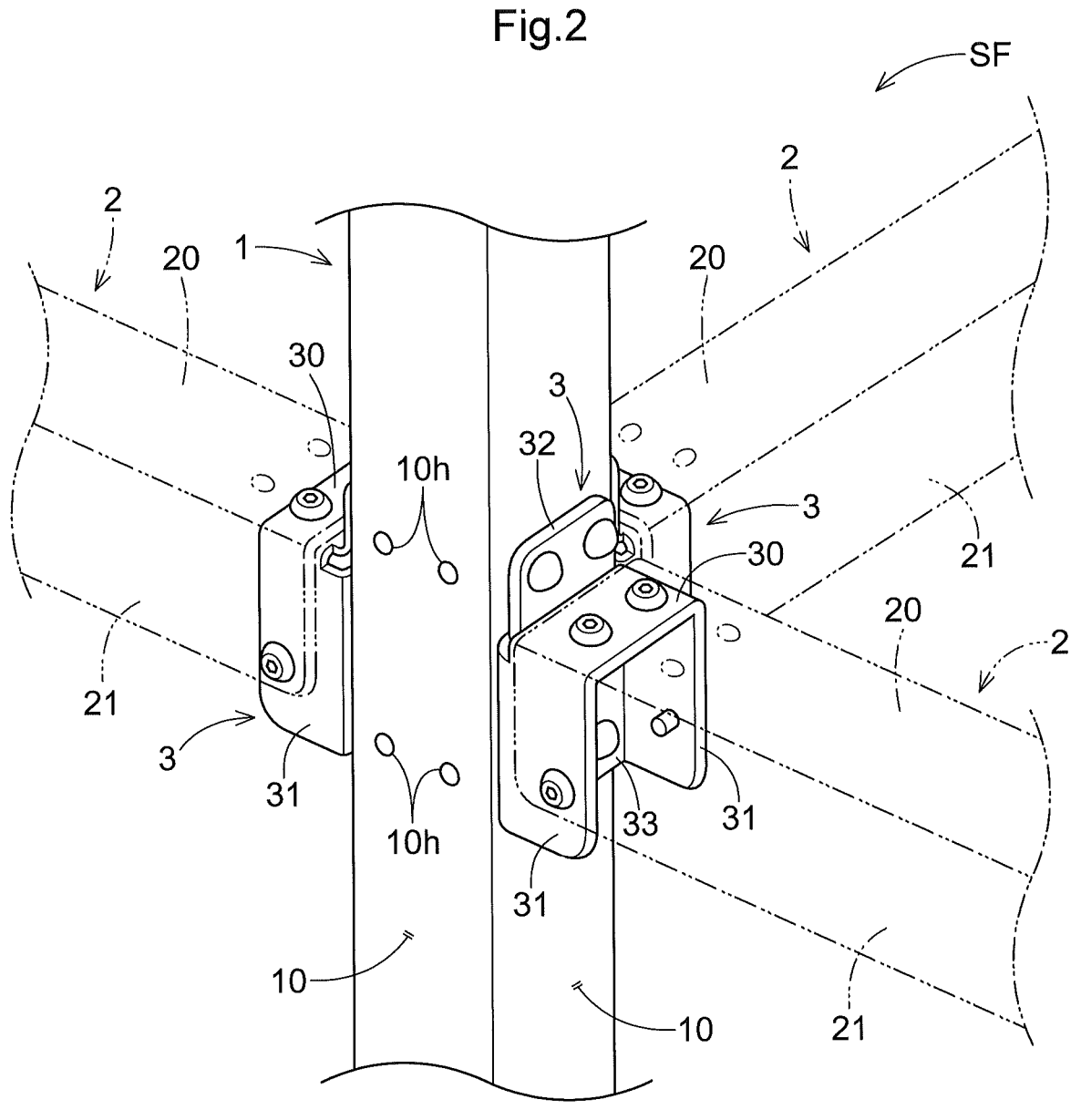
FIG. 2 is a perspective view of a joint area between a column and beams.

The support frame SF is a combination of a plurality of columns 1 (see FIG. 5) and a plurality of beams 2, as shown in FIG. 2. The columns 1 extend in the up-down direction. The beams 2 are joined to the columns 1 and extend in the horizontal direction.

Each column 1 of the present embodiment has a rectangular column shape with four side faces 10. The columns 1 are hollow. A joint member 3 for joining a beam 2 to the column 1 is attached to each of the four side faces 10. Accordingly, up to four beams 2 can be joined to one column 1. With this, up to four beams 2 can be joined to a column 1 when the column 1 is disposed in an area other than an outer edge of a travel surface Ff, thus making it easy to appropriately support the travel floor F with use of the beams 2. Note that the number of beams 2 to be joined to one column 1 can be determined as needed.

The joint member 3 joins an end portion of a beam 2 in the extension direction to a side face 10 of a column 1. In this example, a beam 2 is joined to a column 1 by the joint member 3 attached to the column 1 supporting the beam 2.

The joint member 3 of the present embodiment has a support section 30 supporting a beam 2 from below, a pair of side wall sections 31 extending downward from two ends of the support section 30 in the width direction (a direction orthogonal to both the up-down directions and the extension direction of the beam 2), an upper fixing section 32 bent upward from the support section 30 and extending along the side face 10 of the column 1, and a side fixing section 33 bent inward in the width direction from the side wall sections 31 and extending along the side face 10 of the column 1.

The upper fixing section 32 and the side fixing section 33 of the joint member 3 are fixed to the side face 10 of the column 1. In this example, each side face 10 of the column 1 has through holes 10*h*. The upper fixing section 32 and the side fixing section 33 are fixed to the side face 10 of the column 1 by rivets that extend through the through holes 10*h*.

Each beam 2 has a supported section 20 supported by the support section 30 of the joint member 3, and a pair of downward-extending sections 21 that extend downward from two ends of the supported section 20 in the width direction (a direction orthogonal to both the up-down direction and the extension direction of the beam 2). The supported section 20 is disposed on the support section 30. Each of the two downward-extending sections 21 is disposed on the outer side, in the aforementioned width direction, of the side wall section 31 located on the same side in the width direction, of the two side wall sections 31. With this, the beam 2 is disposed so as to cover the joint member 3 as viewed in the extension direction of the beam 2. The beam 2 in this state is fixed to the joint member 3 by fastening members, such as bolts.

Figure 3:
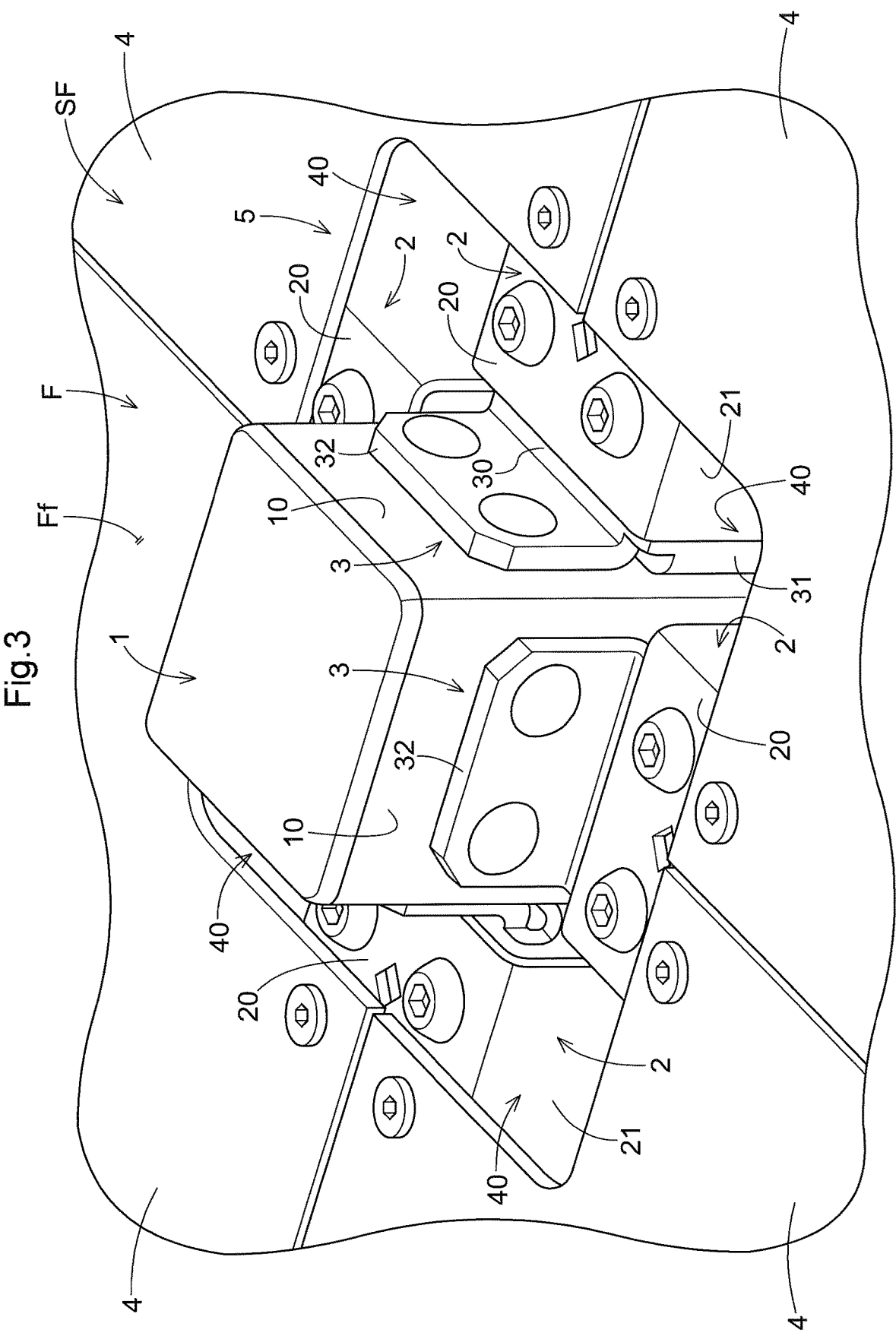
FIG. 3 is a perspective view of a region around a column through hole.

Floor plates 4 are placed on an upper face of the beam 2, as shown in FIG. 3. The floor plates 4 are fixed to the beam 2 by fastening members, such as bolts. In the present embodiment, a plurality of (four in this example) floor plates 4 are disposed so as to surround the column 1. One floor plate 4 is joined to one column 1 and fixed to two adjacent beams 2 while placed on the upper faces of the two beams 2.

Figure 5:
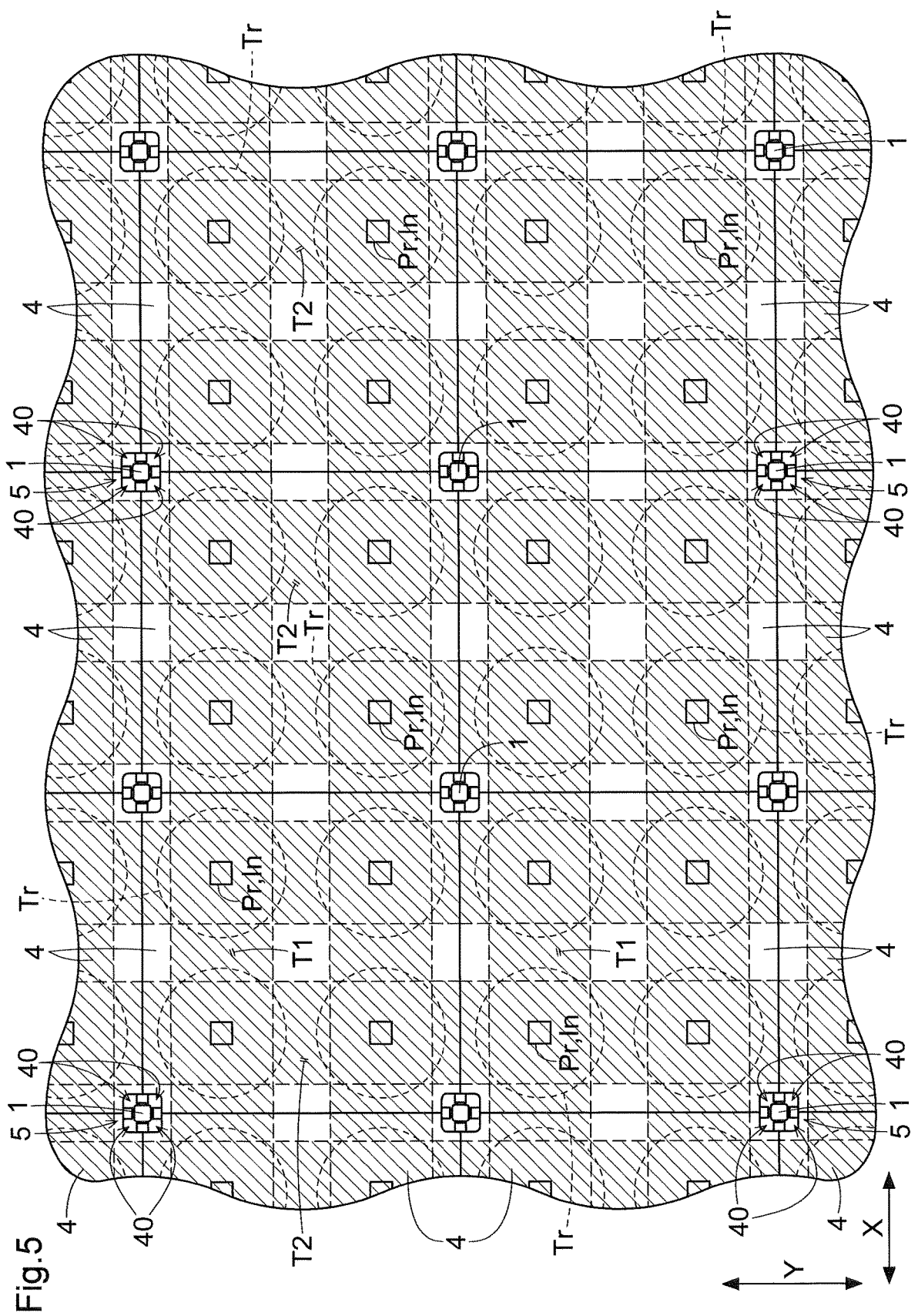
FIG. 5 is a plan view of a part of a travel floor.

The travel surface Ff on each of the travel floors F is formed by upper faces of a plurality of floor plates 4 disposed next to each other in a plane (see FIG. 5 also). Each of the floor plates 4 has a rectangular shape as viewed in the up-down direction. The travel surface Ff may be formed by a plurality of floor plates 4 of the same size and the same type or different types of floor plates 4 of different sizes. Also, the travel surface Ff may be formed by different types of floor plates 4 having a square or rectangular shape as viewed in the up-down direction.

Each travel floor F includes column through holes 5 in which the columns 1 are disposed, as shown in FIG. 3. Each column 1 is disposed so as to extend through a corresponding column through hole 5, and thus extends through the travel floor F.

Each column 1 extends through the travel floor F at least one level in the up-down direction and protrudes upward of a corresponding travel surface Ff. The column 1 of the present embodiment extends through the travel floor F at least the lowermost level in the up-down direction and protrudes upward of the corresponding travel surface Ff. Thus, a configuration that allows the column 1 to extend through the travel floor F and protrude upward of the travel surface Ff enables the column 1 to be disposed not only at an outer edge of the travel floor F but also on the central side of the travel floor F. Accordingly, the rigidity of the travel floors F at a plurality of levels can be easily ensured.

In the present embodiment, some of the plurality of columns 1 extends through only the travel floor F at the lowermost level.

That is, in this example, some of the columns 1 extend through only the travel floor F at the first level. Although not shown in detail in the figures, other columns 1 extend through the travel floors F at the lowermost level and a level above the lowermost level. That is, in this example, the other columns 1 extend through the travel floors F at the first and second levels.

In the present embodiment, the joint members 3 attached to each column 1 extend through the column through hole 5. Thus, the column through hole 5 of the present embodiment is also used as a region for disposing the joint members 3. Thus, it is possible to realize appropriate joining between the columns 1 and the beams 2 by using the joint members 3 while suppressing expansion of the travel floors F by disposing the joint members 3.

In the present embodiment, a portion of each joint member 3 extends through the column through hole 5. Specifically, the upper fixing section 32 of the joint member 3 extends through the column through hole 5 and is located above the travel surface Ff. Each joint member 3 supports a beam 2 from below. Thus, it is favorable that the portion of the joint member 3 that is fixed to the column 1 is large in the up-down direction because the support strength for supporting the beam 2 extending in the horizontal direction can be improved. According to the above configuration, the upper fixing section 32 of the joint member 3 extends through the column through hole 5 and is located above the travel surface Ff. This enables the portion of the joint member 3 fixed to the column 1 to be large in the up-down direction. As a result, the support strength for supporting the beam 2 can be improved.

Meanwhile, the support section 30 of the joint member 3 supports the beam 2 from below. Further, this beam 2 supports the floor plate 4 forming the travel surface Ff from below. Accordingly, the support section 30 and the portion of the joint member 3 that is below the support section 30 are disposed below the travel surface Ff. With this configuration, portions of the joint member 3 other than the upper fixing section 32 are disposed below the travel surface Ff. Thus, the column through hole 5 need only be of a size that allows the upper fixing section 32 to extend therethrough, and the portions of the joint member 3 other than the upper fixing section 32 need not extend through the column through hole 5. Accordingly, the size of the column through hole 5 when viewed in the up-down direction can be easily kept small while the upper fixing section 32 is disposed above the travel surface Ff. Furthermore, expansion of the travel floor F can be suppressed.

The transport vehicle V is configured to travel on the travel surface Ff of the travel floor F that is configured as described above.

Figure 4:
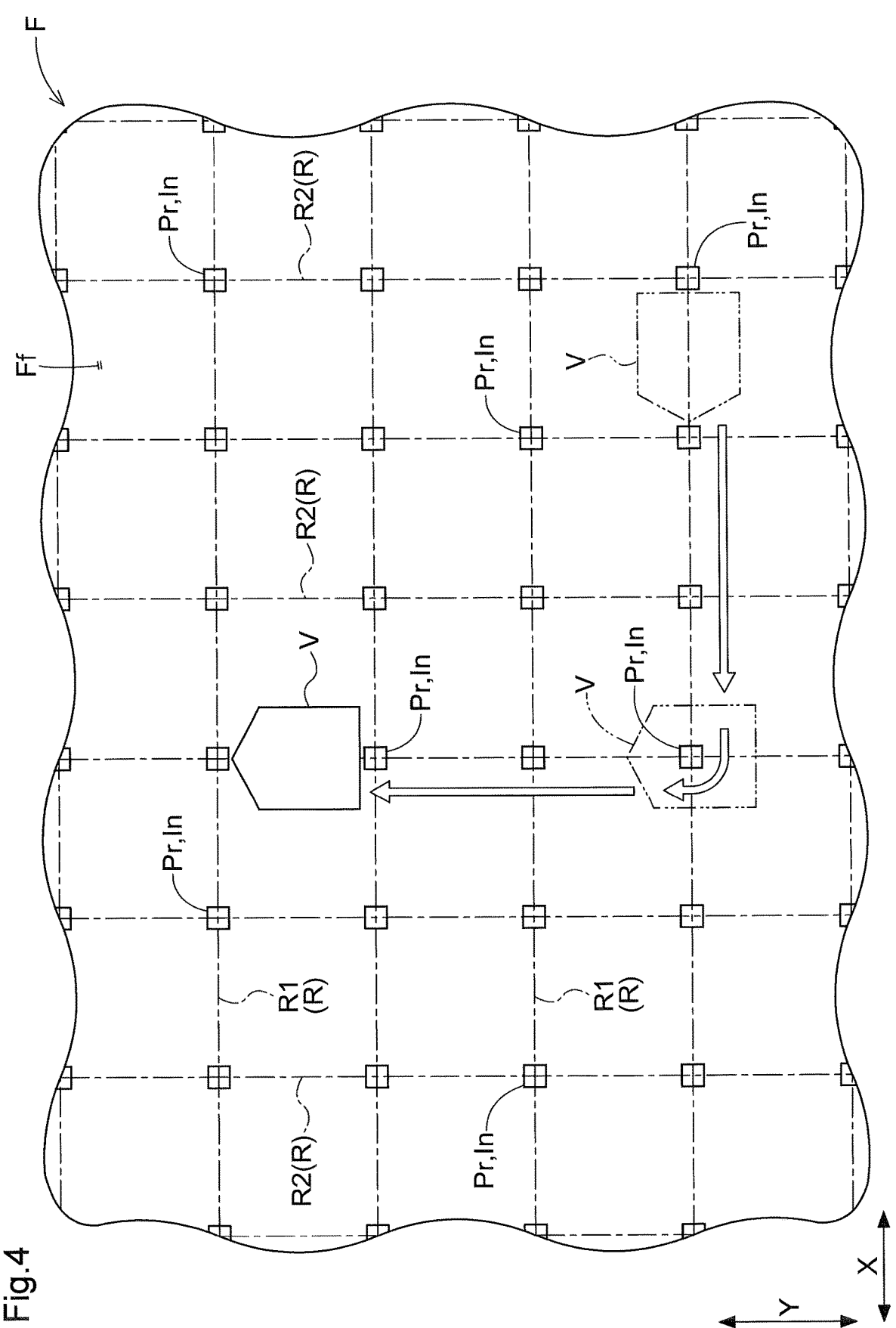
FIG. 4 illustrates traveling movement of a transport vehicle.

FIG. 4 shows a portion of the travel surface Ff in a simplified manner. A first direction X refers to a specific direction parallel to the travel surface Ff, and a second direction Y refers to a direction that is parallel to the travel surface Ff and orthogonal to the first direction X.

The travel surface Ff includes first travel routes R1, which are travel routes R of the transport vehicle V extending along the first direction X, second travel routes R2, which are travel routes R of the transport vehicle V extending along the second direction Y, and turning positions Pr, which are located at intersecting points of the first travel routes R1 and the second travel vehicle R2 and at which the transport vehicle V is allowed to turn.

In the present embodiment, a plurality of first travel routes R1 and a plurality of second travel routes R2 form a grid as viewed in the up-down direction. As mentioned above, the transport vehicle V is configured to travel straight and to change directions by executing a turning movement, i.e. turning about an axis in the up-down direction on a spot. The transport vehicle V is capable of traveling along any of the travel routes R on the travel surface Ff by executing straight travel and turning movements in combination.

In the present embodiment, a position information storage unit In that stores position information regarding a corresponding location is provided at a plurality of locations on the travel surface Ff. The travel routes R in this example are set so as to connect a plurality of position information storage units In. More specifically, the first travel routes R1 are set so as to connect a plurality of position information storage units In that are next to each other in the first direction X. The second travel routes R2 are set so as to connect a plurality of position information storage units In that are next to each other in the second direction Y.

The turning positions Pr in the present embodiment are set based on the positions of the position information storage units In. In other words, the transport vehicle V is configured to turn at positions where the position information storage units In are disposed.

In the present embodiment, unique identification information is set for each position information storage unit In. The identification information in this example includes address information that indicates the position at which the corresponding position information storage unit In is provided. The transport vehicle V includes a detector (not shown) for detecting the position information storage units In. Detecting any of the position information storage units In with use of the detector enables the transport vehicle V to recognize the position where the detected position information storage unit In is located, i.e. the current position of the transport vehicle V at the time of detection. For example, each position information storage unit In may be a one-dimensional code or a two-dimensional code that carries the identification information. Alternatively, the position information storage unit In may be an RFID (Radio Frequency Identification) tag that carries the identification information.

First straight path T1 refer to paths of the transport vehicle V that travels straight along the first travel routes R1, second straight paths T2 refer to paths of the transport vehicle V that travels straight along the second travel routes R2, and turning paths Tr refer to paths of the transport vehicle V that turns at the turning positions Pr, as shown in FIG. 5. The first straight paths T1, the second straight paths T2, and the turning paths Tr are actually invisible, but these paths are visible in FIG. 5.

The columns 1 that protrude upward of the travel surface Ff are disposed without overlapping the first straight paths T1, the second straight paths T2, and the turning paths Tr as viewed in the up-down direction. The columns 1 are disposed in the column through holes 5 that are formed in the travel floor F. The column through holes 5 are disposed without overlapping the first straight paths T1, the second straight paths T2, and the turning paths Tr as viewed in the up-down direction. In this example, each column 1 and a portion of each joint member 3 attached to the side faces 10 of this column 1 are disposed inward of the corresponding column through hole 5, as viewed in the up-down direction.

Figure 6:
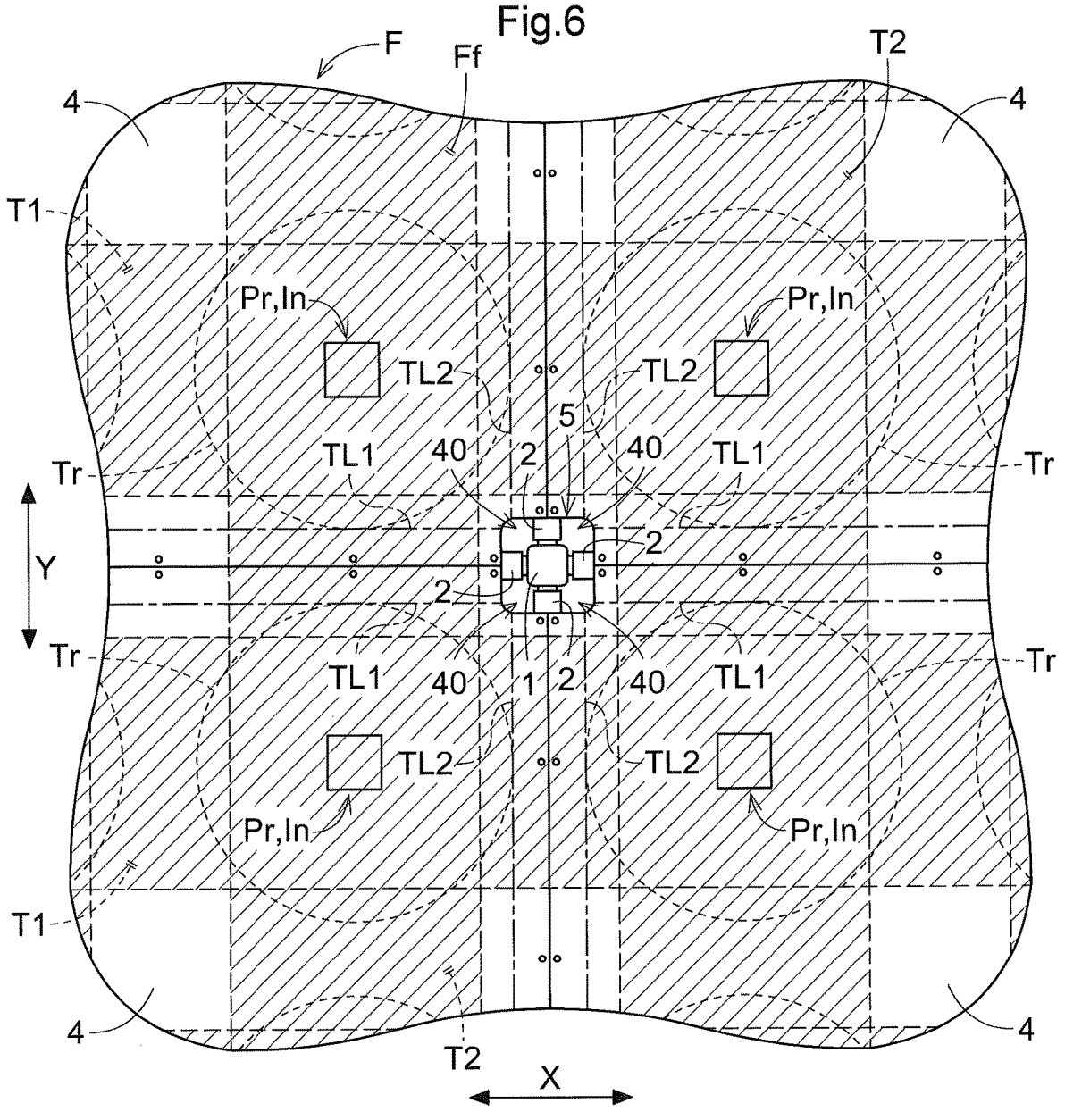
FIG. 6 is an enlarged plan view of an essential part of the travel floor.

Each floor plate 4 has a rectangular shape as viewed in the up-down direction, as mentioned above. Each floor plate 4 of the present embodiment has a cutout 40 at least some of the four corners of the floor plate 4, as shown in FIG. 6. The cutout 40 is formed by cutting out a corner toward the center of the floor plate 4 as viewed in the up-down direction. Each column through hole 5 is constituted by a collection of cutouts 40 formed in a plurality of floor plates 4 adjacent to a column 1. In the example shown in FIG. 6, a collection of cutouts 40 formed in four adjacent floor plates 4 constitutes one column through hole 5. Note that the column through hole 5 does not necessarily need to be formed by four floor plates 4. For example, one column through hole 5 is formed by a collection of cutouts 40 formed in two or three floor plates 4 at an outer edge of the travel surface Ff, and a column 1 is disposed in this column through hole 5.

As mentioned above, the column through holes 5 are disposed without overlapping the first straight paths T1, the second straight paths T2, and the turning paths Tr as viewed in the up-down direction, as shown in FIG. 6. Further, when a first tangent line TL1 refers to a tangent line to an outer edge of a turning path Tr that is parallel to the first direction X, and a second tangent line TL2 refers to a tangent line to the outer edge of the turning path Tr that is parallel to the second direction Y, each column through hole 5 overlaps at least either the first tangent line TL1 or the second tangent line TL2 as viewed in the up-down direction. Each column through hole 5 is disposed at a position that satisfies all of these conditions. That is, each column through hole 5 that is provided in the travel floor F such that a column 1 extends therethrough does not overlap any of the first straight paths T1, the second straight paths T2, and the turning paths Tr as viewed in the up-down direction, and overlaps at least either the first tangent line TL1 or the second tangent line TL2. With this, interference between the columns 1 and the transport vehicle V traveling along any travel route R can be avoided while setting the travel routes R close to each other on each travel floor F.

Each column through hole 5 of the present embodiment overlaps both the first tangent line TL1 and the second tangent line TL2. With this, the travel routes R can be set closer to each other on each travel floor F. In this example, for all (four in the example shown in the figures) turning paths Tr adjacent to each column through hole 5, both the first tangent line TL1 and the second tangent line TL2 to the outer edge of each turning path Tr overlap the column through hole 5. This allows a plurality of position information storage units In (turning positions Pr) around the column through hole 5 to be arranged close to each other. The size of each travel floor F also depends on the intervals between the plurality of position information storage units In disposed on the travel surface Ff. Thus, arranging the position information storage units In close to each other around each column through hole 5 as in the above configuration can also contribute to suppressing expansion of the travel floor F.

OTHER EMBODIMENTS

Next, other embodiments of the article transport facility will be described.

(1) In the above embodiment, an example has been described where each column through hole 5 overlaps both the first tangent line TL1 and the second tangent line TL2 as viewed in the up-down direction. However, without limitation to such an example, each column through hole 5 may overlap only either the first tangent line TL1 or the second tangent line TL2, and need not overlap the other one as viewed in the up-down direction.

(2) In the above embodiment, an example has been described where each joint member 3 extends through the corresponding column through hole 5. However, without limitation to such an example, a mode may alternatively be employed where the entire joint member 3 is located below the floor plate 4 and does not extend through the column through hole 5. In this case, only the column 1 may extend through the column through hole 5. The dimension of each column through hole 5 as viewed in the up-down direction depends on the outer edge of the column 1.

(3) In the above embodiment, an example has been described where a cutout 40 is provided at least some of the four corners of each rectangular floor plate 4, and each column through hole 5 is constituted by a collection of cutouts 40 formed in a plurality of floor plates 4 adjacent to the column 1. However, without limitation to such an example, each column through hole 5 may alternatively be constituted by one hole that extends through a portion of one floor plate 4 other than the outer edge thereof.

(4) In the above embodiment, an example has been described where each column 1 has a rectangular column shape with four side faces 10. However, without limitation to such an example, each column 1 may alternatively have a polygonal column shape other than a rectangular column shape, or a circular column shape.

(5) In the present embodiment, an example has been described where the position information storage unit In that stores position information regarding a corresponding location is provided at a plurality of locations on the travel surface Ff, and the travel routes R are set so as to connect a plurality of position information storage units In. However, without limitation to such an example, the position information storage units In may be omitted. In this case, for example, pieces of magnetic tape may be provided on the travel surface Ff, and the travel routes R may be set according to these pieces of magnetic tape. Furthermore, the travel routes R may alternatively be set without use of an object to be detected (such as the position information storage unit In or the magnetic tape) provided on the travel surface Ff.

(6) Note that the configuration disclosed in the above embodiment can also be applied in combination with configurations disclosed in other embodiments as long as no contradiction arises. Regarding other configurations as well, the embodiment disclosed herein is merely an example in all respects. Accordingly, various modifications can be made as appropriate without departing from the gist of the present disclosure.

SUMMARY OF ABOVE EMBODIMENT

The summary of the above-described article transport facility will be described below.

An article transport facility includes:

travel floors at a plurality of levels in an up-down direction;

a support frame supporting the travel floors; and a transport vehicle configured to travel on a travel surface on each of the travel floors, wherein the support frame is a combination of a plurality of columns and a plurality of beams, the travel surface on each of the travel floors includes upper faces of a plurality of floor plates next to each other in a plane, the transport vehicle is configured to travel straight and to change directions by executing a turning movement to turn about an axis in the up-down direction on a spot, the travel surface includes a first travel route, which is a travel route of the transport vehicle along a first direction, a second travel route, which is a travel route of the transport vehicle V along a second direction, and at least one turning position, which is at an intersecting point of the first travel route and the second travel route and at which the transport vehicle is allowed to turn, with the first direction referring to a specific direction parallel to the travel surface, and the second direction referring to a direction that is parallel to the travel surface and orthogonal to the first direction, each of the columns extends in the up-down direction through at least one of the travel floors at one of the plurality of levels, and protrudes upward of the travel surface on the at least one travel floor, and each of the travel floors has column through holes that are through holes for the corresponding columns to extend through, and each of the column through holes does not overlap a first straight path, a second straight path, and a turning path as viewed in the up-down direction, and overlaps at least either a first tangent line or a second tangent line, with the first straight path referring to a path of the transport vehicle while traveling straight along the first travel route, the second straight path referring to a path of the transport vehicle while traveling straight along the second travel route, a turning path referring to a path of the transport vehicle while turning at the turning position, the first tangent line referring to a tangent line to an outer edge of the turning path parallel to the first direction, and the second tangent line referring to a tangent line to the outer edge of the turning path parallel to the second direction.

According to this configuration, interference between the columns and the transport vehicle traveling along any travel route can be avoided while setting the travel routes close to each other on each travel floor. In addition, a configuration that allows the columns to extend through each travel floor and protrude upward of the travel surface enables the columns to be disposed not only at an outer edge of each travel floor but also on the central side of the travel floor. Accordingly, the rigidity of the travel floors at a plurality of levels can be easily ensured.

It is preferable that each of the column through holes overlaps both the first tangent line and the second tangent line.

According to this configuration, the travel routes can be set closer to each other on each travel floor.

It is preferable that each of the columns has a rectangular column shape having four side faces, joint members for joining the beams to the columns are attached to the four side faces, and each of the joint members extends through a corresponding one of the column through holes.

According to this configuration, up to four beams can be joined to a column when the column is disposed in an area other than an outer edge of the travel surface, thus making it easy to appropriately support the travel floor with use of the beams. Further, the joint member for joining a column to a beam extends through the column through hole. That is, the column through hole is also used as a region for disposing the joint member. Thus, it is possible to realize appropriate joining between the columns and the beams by using the joint members while suppressing expansion of the travel floors by disposing the joint members.

It is preferable that each of the floor plates has a rectangular shape as viewed in the up-down direction, each of the floor plates has a cutout at least one of four corners thereof, and each of the column through holes is a collection of cutouts in four of the floor plates adjacent to each other.

According to this configuration, the column through hole can be formed by simply disposing four floor plates next to each other. Accordingly, construction is facilitated.

It is preferable that the article transport facility further includes position information storage units located at a plurality of locations on the travel surface and storing position information regarding corresponding locations, wherein the at least one turning position includes a plurality of turning positions, and the plurality of turning positions are based on positions of the position information storage units.

According to this configuration, the position of each column relative to the turning path of the transport vehicle can be appropriately set based on the position at which the position information storage unit is disposed on the travel surface.

INDUSTRIAL APPLICABILITY

The technology related to the present disclosure can be applied to an article transport facility that includes travel floors at a plurality of levels in an up-down direction, a support frame supporting the travel floors, and a transport vehicle configured to travel on a travel surface on each of the travel floors.

What is claimed is:

1. An article transport facility comprising:
travel floors at a plurality of levels in an up-down direction;
a support frame supporting the travel floors; and
a transport vehicle configured to travel on a travel surface on each of the travel floors, and
wherein:
the support frame is a combination of a plurality of columns and a plurality of beams,
the travel surface on each of the travel floors includes upper faces of a plurality of floor plates next to each other in a plane,
the transport vehicle is configured to travel straight and to change directions by executing a turning movement to turn about an axis in the up-down direction on a spot,
the travel surface includes a first travel route, which is a travel route of the transport vehicle along a first direction, a second travel route, which is a travel route of the transport vehicle V along a second direction, and at least one turning position, which is at an intersecting point of the first travel route and the second travel route and at which the transport vehicle is allowed to turn, with the first direction referring to a specific direction parallel to the travel surface, and the second direction referring to a direction that is parallel to the travel surface and orthogonal to the first direction,
each of the columns extends in the up-down direction through at least one of the travel floors at one of the plurality of levels, and protrudes upward of the travel surface on the at least one travel floor, and
each of the travel floors has column through holes that are through holes for the corresponding columns to extend through, and each of the column through holes does not overlap a first straight path, a second straight path, and a turning path as viewed in the up-down direction, and overlaps both a first tangent line and a second tangent line, with the first straight path referring to a path of the transport vehicle while traveling straight along the first travel route, the second straight path referring to a path of the transport vehicle while traveling straight along the second travel route, a turning path referring to a path of the transport vehicle while turning at the turning position, the first tangent line referring to a tangent line to an outer edge of the turning path parallel to the first direction, and the second tangent line referring to a tangent line to the outer edge of the turning path parallel to the second direction.

2. The article transport facility according to claim 1, wherein:
each of the columns has a rectangular column shape having four side faces,
joint members for joining the beams to the columns are attached to the four side faces, and
each of the joint members extends through a corresponding one of the column through holes.

3. The article transport facility according to claim 1, wherein:
each of the floor plates has a rectangular shape as viewed in the up-down direction,
each of the floor plates has a cutout at at least one of four corners thereof, and
each of the column through holes is a collection of cutouts in four of the floor plates adjacent to each other.

4. The article transport facility according to claim 1, further comprising:
position information storage units located at a plurality of locations on the travel surface and storing position information regarding corresponding locations, and
wherein the at least one turning position includes a plurality of turning positions, and the plurality of turning positions are based on positions of the position information storage units.

\* \* \* \* \*